United States Patent
Lagares Cominas

(12) 
(10) Patent No.: US 11,051,523 B2
(45) Date of Patent: Jul. 6, 2021

(54) PROCESS FOR CURING MEAT USING A STARTER CULTURE

(71) Applicant: METALQUIMIA, SA., Girona (ES)

(72) Inventor: Narcís Lagares Cominas, Besalú (ES)

(73) Assignee: Metalquimia, SA, Girona (ES)

( * ) Notice: Subject to any disclaimer, the term of this patent is extended or adjusted under 35 U.S.C. 154(b) by 59 days.

(21) Appl. No.: 15/121,195

(22) PCT Filed: Dec. 19, 2014

(86) PCT No.: PCT/IB2014/002835
§ 371 (c)(1),
(2) Date: Aug. 24, 2016

(87) PCT Pub. No.: WO2015/128693
PCT Pub. Date: Sep. 3, 2015

(65) Prior Publication Data
US 2016/0366901 A1 Dec. 22, 2016

(30) Foreign Application Priority Data
Feb. 26, 2014 (EP) .................... 14380010

(51) Int. Cl.
| | | |
|---|---|---|
| *A23B 4/22* | (2006.01) | |
| *A23B 4/03* | (2006.01) | |
| *A23B 4/06* | (2006.01) | |
| *A23L 13/40* | (2016.01) | |
| *A23L 13/70* | (2016.01) | |
| *A23L 17/00* | (2016.01) | |

(52) U.S. Cl.
CPC .................. *A23B 4/22* (2013.01); *A23B 4/03* (2013.01); *A23B 4/06* (2013.01); *A23L 13/45* (2016.08); *A23L 13/74* (2016.08); *A23L 17/65* (2016.08); *A23V 2002/00* (2013.01)

(58) Field of Classification Search
CPC .... A23B 4/22; A23B 4/06; A23B 4/03; A23L 13/45; A23L 17/65; A23L 13/74; A23L 34/03; A23V 2002/00
USPC ........................................................ 426/56
See application file for complete search history.

(56) References Cited

U.S. PATENT DOCUMENTS

| | | | |
|---|---|---|---|
| 5,658,605 A | | 8/1997 | Soeda et al. |
| 6,063,410 A | * | 5/2000 | Vedamuthu ............... A23B 4/12 |
| | | | 426/105 |
| 6,383,549 B1 | * | 5/2002 | Agostinelli ............... A23B 4/03 |
| | | | 426/105 |
| 6,680,077 B1 | * | 1/2004 | Bailey .................. A23B 4/0235 |
| | | | 426/58 |
| 2002/0106443 A1 | * | 8/2002 | Liberman ............... A23B 4/068 |
| | | | 426/656 |
| 2007/0202240 A1 | | 8/2007 | Comaposada Beringues |
| 2009/0232939 A1 | | 9/2009 | Berge |
| 2009/0252832 A1 | | 10/2009 | Falk et al. |
| 2013/0084372 A1 | * | 4/2013 | Lipinski .................. A23L 13/03 |
| | | | 426/281 |

FOREIGN PATENT DOCUMENTS

| | | |
|---|---|---|
| EP | 0677250 A2 | 10/1995 |
| EP | 0776611 B1 | 1/2002 |
| EP | 1063902 B1 | 9/2005 |
| IE | 20070892 A1 | 6/2009 |

OTHER PUBLICATIONS

Smith, J. L. et al. 1983. J. Food Protection. 46: 997-1006 (Year: 1983).*
Gerhard Feiner, "Meat products handbook" In "Meat products handbook" Jan. 1, 2006, Woodhead Publishing Limited, Cambridge, England, XP055132620, pp. 420-437, p. 422,424,433.
European Search Report of European Priority Application No. 14380010.0 dated Aug. 14, 2014.

* cited by examiner

*Primary Examiner* — Hamid R Badr
(74) *Attorney, Agent, or Firm* — Robert J. Hess; Hess Patent Law Firm

(57) ABSTRACT

The present invention relates to a method for the application and implantation of starter cultures in products of animal origin for curing same, which comprises:

a) introducing one or more starter cultures of *Staphylococcus* and yeasts in a whole muscle product of animal origin by means of sprinkling, tumbling and massaging;

b) subjecting said product after step a) to maturation treatment with heat and humidity to favor starter culture growth;

d1) freezing the product after step b), stopping the starter culture biological activity; and d2) cutting or slicing the frozen product; and d3) subjecting cutted or sliced product to a rapid drying process for between 30 and 120 minutes; and e) packing the dried product of animal origin.

20 Claims, 1 Drawing Sheet

| STEP | DURATION | TEMPERATURE | HUMIDITY |
|---|---|---|---|
| a) | | | |
| a1) | | | |
| a2) | 30 to 240 min | | |
| rest | 4 to 24 hours | 1 to 10°C | |
| a3) | 1 to 4 days | | |
| rest | | 1 to 10°C | |
| b) | 1 to 4 days | 18 to 28°C | 85% to 95% |
| c) | 0 to 14 days | | |
| d) | | | |
| d1) | | below 0°C | |
| d2) | | | |
| d3) | 30 to 120 min | | |
| e) | | | |

PROCESS FOR CURING MEAT USING A STARTER CULTURE

This application is the US national phase application of international application number PCT/IB2014/002835, filed 19 Dec. 2014, which designates the US and claims priority to European Patent Application No. EP14380010.0 filed 26 Feb. 2014, the contents of each of which are hereby incorporated by reference as if set forth in their entireties.

TECHNICAL FIELD

The present invention relates to a method for the application and implantation of starter cultures in products of animal origin for curing same, speeding up the curing process and maintaining and/or improving the organoleptic properties of the cured product.

STATE OF THE ART

The use of a starter culture made up of bacteria, for example, to speed up the process of macerating and curing products of animal origin, is known.

Document EP1063902B9, for example, describes a process for producing meat products, particularly high quality ham, in which bacteria of the genus *Staphylococcus* or *Lactobacillus* are injected into pieces of whole muscle meat for subsequent tumbling and parboiling with temperatures for developing the starter culture. However, this document describes cooking the product of animal origin in the final step of the process in order to preserve it and to eliminate the starter culture, this process therefore being inapplicable for obtaining a simply cured product. Other drawbacks of this process are the need to inject the culture into the pieces of meat and the low concentration of salt allowed by this method.

Document EP776611B1 also describes a method similar to that described above, but in which after the fermentation derived from the parboiling treatment, the whole product is dried as fast as possible without causing fat run or cartilage hardening, with a product weight reduction between 30-34% by exposing the product to different humidities and air streams. The product is then vacuum packed or packed in a modified atmosphere, subsequently subjecting the packed product to pasteurization or quarantine. This method requires long drying with conventional means which, as mentioned in the document, can last up to 60 hours operating with hot air at 22° C. A low salt content to assure the development of the starter culture prevents the cured finished product from containing enough salt to assure proper medium-term preservation without vacuum packing or packing in a modified atmosphere, and a pasteurization process or quarantine is applied to assure that no pathogen grows in the product throughout the long drying phase. Document US20090252832 also discloses mixing starter cultures with raw meat, followed by a process of cooling and heating, but in this case the end product is cooked, eliminating the starter culture, which does not make this process applicable to cured products of animal origin either.

Adding starter culture into a meat product, and produce its maturation is already known through documents US20090232939 and the publication "Meat products handbook" of Gerhard Feiner (Woodhead Publishing Limited, Cambridge, England, XP055132620, pages 420-437).

The said documents do not disclose a sudden stop of the maturation process through the meat freezing, and later obtaining a cured meat product by a rapid drying process preventing ulterior biological activity of said starter cultures Document EP0677250 disclose meat product sliced under frozen condition to facilitate said slicing, and thereafter produce a rapid drying process of said slices performed in a refrigerated or ventilated storage. This document do not disclose the use of starter cultures to produce meat maturation, so the freezing process and the rapid drying process are not adapted to prevent the undesired maturation of the meat produced by the starter cultures during or after said freezing or drying processes.

Document US20070202240 discloses a maturation process without the use of starter culture, said process including a first step of slicing, a second step of drying using a vacuum conditions, introducing said slices into a modified atmosphere in a third step, and producing the meat maturation on said modified atmosphere conditions. As in the previous case, no starter culture is added to the meat, and the maturation process is performed after the drying process and not before, so the drying process do not prevent the maturation process.

The Irish document IE20070892 discloses a meat treatment without any starter culture addition, and including "drying the exposed surface of the meat" which has not been sliced, but not including drying the meat itself.

Finally document U.S. Pat. No. 5,658,605 discloses a meat treatment method including tumbling, vacuum packing, maturing, freezing, and slicing the meat product, but including a final cooking process, instead of the proposed drying process. Furthermore the products added to the meat are not starter culture.

None of the mentioned prior art documents discloses producing a sudden stop of the biological activity process favored by the starter culture by means of freezing, cutting the product into slices and rapidly drying said slices in a time less than 120 minutes preventing any additional biological activity.

BRIEF DESCRIPTION OF THE INVENTION

The invention proposes a method for the application and implantation of starter cultures, commonly called "starters" in the food industry, in products of animal origin for curing same.

Starter cultures are generally bacterial cultures with a very high proteolytic and/or lipolytic capacity, such as micrococci, particularly micrococci of the genus *Staphylococcus*. The inclusion of yeasts and/or sugars is also contemplated.

Said products of animal origin are usually pieces of whole muscle meat from farm animals, preferably bovine, caprine, ovine, porcine, poultry livestock, although it is also applicable to fish.

Said method comprises the following steps:
a) introducing one or more starter cultures in said product of animal origin;
b) subjecting said product of animal origin with starter cultures to maturation treatment with heat, known as parboiling, with control over the temperature and humidity conditions to favor starter culture growth for a first time period;

The preceding steps are already known in the state of the art and are followed according to the proposal of this invention by several steps of treatment not known in the state of art and a final packing, as indicated below:

After said first time period of step b), a step d) is performed which includes: d1) transferring the product of animal origin with starter cultures to frozen conditions, determining a sudden stop of the mentioned biological activity process; and thereafter;

d2) cutting or slicing the frozen product of animal origin; and d3) applying a curing and rapid drying process on said sliced or cut frozen product of animal origin with starter cultures for a second time period comprised between 30 and 120 minutes, reducing the water content and producing an increase in the salt concentration due the water loss, such that at ambient temperature, the starter culture remaining on the product of animal origin cannot reproduce or perform their biological activity due the low water content and the high salt content of the cured product; and as a final step: e) packing the dried product of animal origin.

Therefore, steps a) and b) of the method allow the inoculation, infiltration, and multiplication of the starter culture in the product of animal origin, and particularly steps b) favor said starter culture performing a proteolytic and/or lipolytic activity, thus improving the organoleptic properties of the product of animal origin.

According to a preferred embodiment, said inoculation and infiltration of step a) is performed by means of the following steps:

a1) applying said at least one starter culture on the outer surface of the product of animal origin, for example by sprinkling a solution of said starter culture, even though other methods such as injection would also be possible;

a2) massaging the product of animal origin for said first time period, preferably by means of repeated tumbling process inside a rotary drum which can allow controlling the temperature and pressure, and performing alternating cycles of massaging and standing at will; said massaging favors the penetration of the starter culture and tenderizes the product of animal origin;

a3) applying salting agents, such as brine, or a dry curing agent, such as salts and nitrites, for example, to the product of animal origin and subjecting it to one or more massaging actions alternating with one or more standing periods.

Step a2) can have a duration between 30 and 240 minutes, enough time to tenderize the product of animal origin and to open up its fibers, facilitating the penetration of the starter culture, and it can be followed by a step of standing in cold conditions with temperatures between 2 and 10° C., and/or in vacuum conditions for between 4 and 24 hours, which allows said starter culture to settle inside the product of animal origin.

Step a3) allows salting the product of animal origin by means of said salting agents once the starter culture has already settled in said product, and therefore when the microorganism growth inhibiting properties of the salting agents can no longer interfere with said settling. Furthermore, the amount of brine or curing agent added is controlled to assure that the concentration of said salting agents in the product of animal origin is less than the threshold which prevents the development of the starter culture. Said step a3) can be followed by a step of standing in cold conditions with temperatures between 2 and 10° C., and/or in vacuum conditions to allow the penetration of the salting agents into the product, and the slow acclimation of the starter culture to the new salting agent concentration conditions. The salting agent aids in the preservation of the cured product and improves its flavor, and it can also include other additives that provide flavor, color or smell to the cured end product.

Said parboiling step b) allows the starter culture to spread out and start its biological activity and proteolytic and/or lipolytic activity, which causes the maceration of the product of animal origin and the alteration of its organoleptic properties. Said step b) can be prolonged during the mentioned first time period comprised between 1 and 4 days.

In addition to maintaining the biological activity of the starter culture, the mentioned controlled temperature and humidity conditions of step b) allow said starter culture to spread out and occupy the entire product, preventing other bacteria that would damage the product from developing. As a result of the strict control of said environmental variables, water loss in the product of animal origin (essential element for the development of the starter culture and of other microorganisms) as well as the concentration of salt are regulated, since water losses increase salt saturation and pH.

A pH level of less than 5.3 would inhibit the biological activity of the starter culture since the micrococci of the genus *Staphylococcus* are sensitive to this parameter and would allow the development of other potentially pathogenic agents.

Throughout the mentioned step b), temperatures in the order of 30° C. would normally be used since mesophilic organisms would be selected. The high humidity between 85% and 95% would prevent the product from drying and the subsequent increase in the concentration of the salting agents.

Step b) can be performed with the product of animal origin molded inside containers, optionally subjected to pressure.

Step d1) suddenly stops the biological activity of the starter culture freezing the product of animal origin, preventing its development and metabolic activity by depriving it of energy, oxygen and water in liquid state through freezing said product. This allows controlling the degree of maturation of the product of animal origin with precision, stopping it at the right time because freezing can be achieved in a short period of time during which starter culture cannot change the degree of maturation substantially due the shortness of the time. So when step b) has produced the perfect degree of maturation said maturation can be suddenly stopped by freezing, preventing subsequent maturation of the product of animal origin. The d1) step also allows storing the macerated product in this perfect degree of maturation for the desired time, which allows adapting production to the demand and acquisition requirements both of the raw product of animal origin and of the cured product.

Step d1) can be performed with the product of animal origin molded inside containers, optionally subjected to pressure.

When the method is to be completed, step d2) is performed which includes slicing or dicing the frozen product of animal origin. Optionally steps d1) can be performed after step d2).

After step d2), step d3) is performed which includes subjecting the slices or dices to a rapid drying process, for example, by means of a chamber with dry hot air, by means of infrared, by means of vacuum, by means of microwaves, or by means of any combination of the preceding processes. This rapid drying eliminates part of the water contained in the product of animal origin and causes a weight reduction and an increase in the concentration of salt which is a known preservative, such that despite the temperature increase from freezing temperature until ambient temperature, starter culture residues which survived the freezing process and which may remain in the product, cannot reproduce or perform their biological activity due to the absence of water and the high salt content of the cured end product of animal origin. Said rapid drying process is performed according to this invention in a very short period of time, so that during said period of time the slices or dices are first thawed due the temperature increase, and later dried, so during a fraction of said rapid drying process the product of animal origin will be unfrozen but not yet dried, and subjected for a while to a temperature range capable to perform the starters culture maturation process. If said fraction of the drying process extends too long, the starters culture can produce undesired maturations of the product, for this reason the drying process according to this invention is a rapid process, reducing said fraction of time making impossible an appreciable product maturation.

Said step d3) can extend for between 30 and 120 minutes depending on the type of product of animal origin used, on the size and thickness of the slices or dices, or on the cured product to be obtained. For example, a drying time of about 40 minutes is usually used for obtaining cured products from ham, but drying times between 40 and 120 minutes will usually be used for obtaining a meat snack type product with very low water content suitable for preservation without refrigeration, even being able to obtain crunchy textures.

Finally, packing, which can include vacuum packing or packing in a modified atmosphere, is performed to prevent future bacteria or yeast growths, or in the case of drier products, a simple air-tight container to prevent the product re-hydration.

Optionally once step b) ends and before starting step d), a step c) can be performed, said step c) including:
arranging said product of animal origin in a chamber under controlled temperature and humidity conditions to maintain the biological activity of the starter culture and its proteolytic and/or lipolytic capacity for a time period up to 14 days.

Step c) is optional, depending on the type of product of animal origin treated, or on the cured product to be obtained, being periods between 1 and 7 days common, and being able to be prolonged up to 14 days, for example in cases of larger slices for obtaining pieces of ham. Throughout this step, strict control over the environmental conditions is also performed with the same premises as in step b), but preventing uncontrolled growth of the starter culture, while at the same time allowing its biological activity, thus being able to maintain this activity for several days without causing any damage to the batch of product of animal origin.

Step c) can be performed with the product of animal origin molded inside containers, optionally subjected to pressure.

According another embodiment, said product of animal origin with starter cultures is transferred to frozen conditions being packed under vacuum conditions into a package. Before performing stage d2) said package and said vacuum conditions are retired.

Rapid treatment of the product of animal origin by means of starter cultures is therefore achieved, but it is not necessary to cook said product of animal origin to eliminate the starter culture at the end of the curing process or pasteurize it, obtaining a cured product by safe drying which is obtained rapidly.

Other features of the invention will be described in the following detailed description of an embodiment.

BRIEF DESCRIPTION OF THE DRAWINGS

The foregoing and other advantages and features will be better understood from the following detailed description of an embodiment in reference to the attached drawings which must be interpreted in an illustrative and non-limiting manner, in which:

FIG. 1 shows a diagram with the steps making up the method, indicating the duration, temperature and humidity ranges of some of said steps, and indicating an optional step c) with a dashed line.

DETAILED DESCRIPTION OF AN EMBODIMENT

The method for the implantation of starter cultures in products of animal origin for curing the same starts with the selection of pieces of whole muscle meat that are free of bones, skin, fat, tendons or cartilages, from a cow or a pig, for example. Said pieces are then introduced inside a massaging rotary drum and a starter culture is also added. The product of animal origin may have been subjected to massaging and/or standing between 6 hours and 7 days at low positive temperatures between 1° C. and 10° C. before adding the starter culture or before eliminating the bones, skin, fat, etc.

According to the present embodiment, the starter culture is made up of micrococci of the genus *Staphylococcus*, which are mesophilic bacteria, with nitrate reductase capacity facilitating the generation of color from nitrates, providing a more appealing and stable appearance to the cured product, and it is also made up of yeasts aiding in the generation of aromas; the starter culture includes sugars favoring the growth of the rest of the starter culture, or said sugar is added before the step of parboiling the product of animal origin.

The mentioned rotary drum tumbles the pieces of meat, mixing them with the starter culture and massaging them, which favors the opening of their fibers and the penetration of the starter culture therein, in addition to tenderizing them.

The massaging and tumbling are preferably prolonged between 30 and 240 minutes and performed in cold condition with temperatures between 1° C. and 10° C., also being able to be performed in a vacuum.

The product of animal origin is then left to stand in cold condition between 1° C. and 10° C., between 4 and 24 hours, this standing also being able to be carried out in a vacuum.

At this point, it is considered that the starter culture has completely impregnated the product of animal origin already and has settled, and a salting agent, such as brine, for example, or dry curing agents are added, after which the tumbling and massaging operations in the rotary drum are alternated with standing periods, always in cold condition between 1° C. and 10° C., and optionally in a vacuum.

It must be taken into account that an excessive concentration of salting agent would reduce or inhibit the activity of the starter culture, so the amount and the concentration of said agent will be strictly controlled so that it does not reach this excessive concentration, and the cold and a high humidity level will be maintained to prevent the batch from losing moisture, which would increase the concentration of the mentioned salting agent.

Once this process is completed, the product of animal origin can optionally be filled in permeable casing, and parboiling, which is a step of thermal maturation treatment with heat, is performed, providing optimal conditions for starter culture growth and multiplication. In this case, since the organisms are mesophilic organisms, the optimal temperature will be between 18° C. and 35° C. A relative humidity between 85% and 95% will assure that there are no humidity losses and, therefore, that the concentration of the salting agent will not increase. This step is prolonged between 1 and 4 days, and it will also favor the biological activity of the starter culture and its proteolytic and/or lipolytic enzyme production, which will alter the organoleptic properties of the product of animal origin.

When the development of the starter culture has reached an optimal degree, the step in which the temperature and/or the humidity is reduced is started in order to reduce starter culture growth, but allows its biological activity, continuing with the alteration of the organoleptic and physicochemical properties of the product of animal origin. This step lasts for about 1 to 7 days.

Once the desired degree of curing is achieved, the biological activity of the starter culture is stopped by means of eliminating the excess liquid and freezing the product of animal origin, and it is vacuum packed, optionally molding the product of animal origin inside molds under pressure, giving it a manageable shape and regulating the product.

When the method is to be completed, the frozen product is diced or sliced and the diced or sliced product is rapidly dried by means of dry hot air, by means of vacuum, infrared light, or by a combination of the preceding methods, for example, by depositing the mentioned dices or slices of frozen product on trays that are subjected to hot air stream.

The frozen product will thus go from being frozen to being thawed and with a low water content in a short time period of less than 120 minutes.

Since the concentration of water is reduced, the concentration of salt increases, said salt acting as an inhibitor of the growth of bacteria that may remain in the product after freezing, assuring the proper preservation of the uncooked product without having to freeze it again.

Finally, after drying the cured product is either vacuum packed or packed in a modified atmosphere to prolong its preservation.

The invention claimed is:

1. A method for the application and implantation of starter cultures in a whole muscle product that is of animal origin for curing same, which comprises:
    a) introducing one or more starter cultures with proteolytic and/or lipolytic activity in said product of animal origin;
    b) subjecting said product of animal origin with starter cultures to maturation treatment with heat, with control over the temperature and humidity conditions to favor starter culture growth for a first time period to produce a proteolytic and/or lipolytic activity on the product of animal origin by the starter cultures;
performing, after said first time period of step b), a step d) which includes:
    d1) when step b) has produced the proteolytic and/or lipolytic activity on the product of animal origin, which is uncooked, said proteolytic and/or lipolytic activity is stopped by transferring the product of animal origin with the starter cultures to frozen conditions in a period of time whose duration prevents further proteolytic and/or lipolytic activity during said period of time, determining a sudden stop of a biological activity and preventing subsequent proteolytic and/or lipolytic activity of the product of animal origin; and thereafter
    d2) slicing or cutting the frozen, uncooked, product of animal origin, and
    d3) applying a curing and rapid drying process on said sliced or cut, frozen, uncooked, product of animal origin with remaining starter cultures that survived the freezing process for a second time period comprised between 30 and 120 minutes, during said second time period said sliced or cut frozen, uncooked product of animal origin is first thawed due to a temperature increase and later dried in a rapid drying process, wherein said rapid drying process is adjusted to reduce water content to a low water content and to produce an increase in salt concentration to a high salt content based on a determination of said low water content and said high salt content needed to prevent the starter cultures that are remaining on the sliced or cut uncooked product of animal origin from reproducing or performing their biological activity at ambient temperature; and
    e) packing the cured, dried, sliced or cut, thawed, uncooked, product of animal origin with remaining starter cultures in an air-tight container to prevent re-hydration of the packed, cured, dried, sliced or cut, uncooked, thawed meat product by maintaining the low water content and the high salt concentration and preserving said packed, cured, dried, thawed, uncooked, meat product in the air-tight container at ambient temperature.

2. The method according to claim 1, wherein step a) comprises:
    a1) applying said at least one starter culture on the outer surface of the product of animal origin;
    a2) massaging the product of animal origin for said first time period to favor the penetration of the starter culture and to tenderize the product of animal origin;
    a3) applying salting agents, such as brine, or a dry curing agent to the product of animal origin and subjecting the product of animal origin to one or more massaging actions alternating with one or more standing periods, and
in that said first time period of step b) has a duration between 1 and 4 days.

3. The method according to claim 1, wherein the product of animal origin comprises at least ham and in that the second time period has a duration of about 40 minutes.

4. The method according to claim 1, wherein the product of animal origin comprises meat products with a very low water content suitable for preservation without refrigeration, and in that the mentioned second time period has a duration between about 40 and 120 minutes.

5. The method according to claim 1, wherein once step b) ends and before starting step d), a step c) is performed which includes:
    c) arranging said product of animal origin in a chamber under controlled temperature and humidity conditions to maintain the biological activity of the starter culture and the proteolytic and/or lipolytic capacity for a time period up to 14 days.

6. The method according to claim 5, wherein said step c) has a duration comprised between 1 to 7 days.

7. The method according to claim 2, wherein said steps a1) and a2) are performed inside a rotary drum, and in that said step a2) is performed by means of a process with temperature control or by means of a process with different temperature and/or pressure cycles, said step a2) having a duration between 30 and 240 minutes.

8. The method according to claim 2, wherein said step a2) is followed by a first step of standing in cold and/or vacuum conditions for a period of 4 to 24 hours.

9. The method according to claim 2, wherein said step a3) is followed by a second step of standing in cold and/or vacuum conditions, and further comprising:
    introducing the product of animal origin in a permeable casing after the second step of standing.

10. The method according to claim 1, further comprising: performing said step b) inside a mold to increase compaction of the product of animal origin.

11. The method according to claim 5, further comprising: performing said step c) inside a mold to increase the compaction of the product of animal origin.

12. The method according to claim 1, further comprising: performing step d1) inside a mold under pressure.

13. The method according to claim 1, wherein step a3) has a duration of 1 to 4 days.

14. The method according to claim 1, wherein the temperature of step b) is between 18-28° C. and the humidity is between 85-95%.

15. The method according to claim 1, wherein said starter culture comprises sugars and/or at least one species of microorganisms, or a mixture of microorganisms selected from *Micrococcus*, micrococci of the genus *Staphylococcus*, and yeasts.

16. The method according to claim 1, wherein said product of animal origin comprises meat products including products of bovine, ovine, porcine, caprine or poultry origin, or fish.

17. The method according to claim 1, wherein said product of animal origin with starter cultures is transferred to frozen conditions being packed under vacuum conditions into a package and said package and said vacuum conditions are retired before performing stage d2).

18. The method according to claim 1, wherein step d3) is performed by means selected from the group consisting of dry hot air, infrared, vacuum, microwaves and any combinations thereof.

19. A cured whole muscle product of animal origin obtained by means of the method according to claim 1.

20. The method according to claim 2, wherein once step b) ends and before starting step d), a step c) is performed which includes:
c) arranging said product of animal origin in a chamber under controlled temperature and humidity conditions to maintain the biological activity of the starter culture and the proteolytic and/or lipolytic capacity for a time period up to 14 days.

* * * * *